United States Patent
Eckhardt

(10) Patent No.: US 10,126,203 B2
(45) Date of Patent: Nov. 13, 2018

(54) SYSTEM FOR DETECTING AN AIR FILTER CONDITION, IN PARTICULAR FOR COMBUSTION ENGINE

(71) Applicant: FPT Motorenforschung AG, Arbon (CH)

(72) Inventor: Thomas Eckhardt, Romanshorn (CH)

(73) Assignee: FPT MOTORENFORSCHUNG AG, Arbon (CH)

( * ) Notice: Subject to any disclaimer, the term of this patent is extended or adjusted under 35 U.S.C. 154(b) by 454 days.

(21) Appl. No.: 14/749,946

(22) Filed: Jun. 25, 2015

(65) Prior Publication Data

US 2016/0018288 A1    Jan. 21, 2016

(30) Foreign Application Priority Data

Jun. 27, 2014   (EP) .................................... 14174739

(51) Int. Cl.
| | |
|---|---|
| *B01D 46/00* | (2006.01) |
| *G01M 15/09* | (2006.01) |
| *F02M 35/08* | (2006.01) |
| *B01D 46/44* | (2006.01) |
| *F02M 35/09* | (2006.01) |

(Continued)

(52) U.S. Cl.
CPC ......... *G01M 15/09* (2013.01); *B01D 46/0086* (2013.01); *B01D 46/446* (2013.01); *F02M 35/024* (2013.01); *F02M 35/08* (2013.01); *F02M 35/09* (2013.01); *F02M 35/10373* (2013.01)

(58) Field of Classification Search
CPC ......... B01D 46/00; B01D 46/44–46/46; B01D 46/0086; B01D 46/446; B01D 35/143; B01D 37/046; B01D 2279/60; Y02T 10/40; F01N 2550/00; F01N 2900/0416; F02M 35/00–35/168; B60W 20/50; G01M 15/04; G01M 15/042; G01M 3/025; G08B 21/18; Y10S 116/25; G01L 23/24

USPC ............................................................. 95/19
See application file for complete search history.

(56) References Cited

U.S. PATENT DOCUMENTS

| | | | | |
|---|---|---|---|---|
| 8,574,355 B2 * | 11/2013 | Jang | ....................... | F02M 35/09 95/19 |
| 8,613,792 B2 * | 12/2013 | Ragland | ................. | B01D 46/42 700/276 |

(Continued)

FOREIGN PATENT DOCUMENTS

| | | |
|---|---|---|
| DE | 10260784 A1 | 7/2004 |
| EP | 2604818 | 6/2013 |
| EP | 2620202 A1 | 7/2013 |

*Primary Examiner* — Eric Ward
*Assistant Examiner* — Eric Ashbahian
(74) *Attorney, Agent, or Firm* — Stetina Brunda Garred and Brucker

(57) ABSTRACT

Method for detecting an air filter condition, in particular for combustion engines, comprising the following steps: calculation of a linear regression over data-couples values, each comprising pressure drop value at the air filter and square of air flow value crossing the air filter, corresponding to said pressure drop value, in order to obtain an angular coefficient of the linear regression, comparison of the angular coefficient or of the function construed on the angular coefficient with at least one threshold in order to detect an operative condition of the air filter (FIG. 1).

14 Claims, 2 Drawing Sheets

(51) Int. Cl.
*F02M 35/024* (2006.01)
*F02M 35/10* (2006.01)

(56) References Cited

U.S. PATENT DOCUMENTS

| | | | |
|---|---|---|---|
| 2005/0247194 A1* | 11/2005 | Kang | B01D 46/0086 95/19 |
| 2011/0146246 A1* | 6/2011 | Farman | F01N 3/0235 60/286 |
| 2013/0192208 A1* | 8/2013 | Shibata | F01N 11/00 60/276 |
| 2015/0198076 A1* | 7/2015 | Li | F01N 3/106 60/274 |
| 2015/0254958 A1* | 9/2015 | Sherman | G08B 21/18 340/607 |
| 2015/0275738 A1* | 10/2015 | Van Nieuwstadt | B01D 46/0086 73/114.76 |
| 2015/0354480 A1* | 12/2015 | Dudar | F02D 41/0032 701/22 |

\* cited by examiner

SYSTEM FOR DETECTING AN AIR FILTER CONDITION, IN PARTICULAR FOR COMBUSTION ENGINE

CROSS REFERENCE TO RELATED APPLICATIONS

The present application claims priority to European Patent Application No. 14174739.4 filed Jun. 27, 2014, the entirety of the disclosures of which are expressly incorporated herein by reference.

STATEMENT RE: FEDERALLY SPONSORED RESEARCH/DEVELOPMENT

Not Applicable.

FIELD OF THE INVENTION

The present invention relates to the field of the monitoring system of the vehicular component, and in particular to a system for detecting an air filter condition.

DESCRIPTION OF THE PRIOR ART

Software functions for the detection of clogged air filters are known.

Usually, the detection is performed by comparison of the pressure drop over the filter with a certain, maximally permitted threshold value. If the threshold is permanently being exceeded by the measured pressure drop, an error is detected and appropriate countermeasures will be taken by the control unit, e.g. a warning lamp, reduction of engine power, etc.

Sometimes, such detection strategy is not affordable.

Situations are known, depending on engine layout and air flow, where the variation of pressure drop does not change sensitively from an optimal condition to a rather clogged condition. For example the pressure drop at the air filter could be about 10-15 mbar for a new filter cartridge that reaches about 50 mbar for a severely clogged condition.

In addition, due to the strong variability of the ambient pressure, from low pressure of about a few hundred at high altitude, to high pressure of about 1100 mbar at the sea level, these sensors must have very high accuracy for a large pressure variation.

Automotive pressure sensors have typical accuracy of 2% of the full scale, i.e. here about 20 mbar×2 sensors, i.e. 40 mbar in the worst case. Thus the error extent is comparable with the pressure drop change. Thus, it is impossible to detect a clogged filter reliably with such known approach.

SUMMARY OF THE INVENTION

Therefore it is the main object of the present invention to provide a system for detecting an air filter condition, in particular for combustion engines, affordable even in those situations where the pressure drop variation between two extremes conditions, namely new and clogged, is really limited.

The main principle of the invention is to base the condition estimation of the air filter on a linear regression calculation of pressure drop values at the filter versus corresponding squared air volume flow crossing the air filter. Thus, the angular coefficient of the linear regression or a function construed on it is compared with one or more thresholds in order to recognize said operative condition of the air filter.

It is clear that either the angular coefficient or a function of it represent one numeric value.

According to a preferred embodiment of the invention, the angular coefficient is used to calculate the filter pressure drop at a predefined highest theoretical volume flow through the air filter, and compare this corresponding pressure drop with a threshold pressure drop to determine the operative filter condition. Therefore, said pressure drop, calculated on said angular coefficient and on said predefined highest theoretical volume flow, is a numeric value obtained as a function of said angular coefficient value, preliminarily calculated.

The first object of the present invention is a method for detecting an air filter condition, in particular for combustion engines.

Such method is capable to give a reliable picture of the clogging condition of the engine air flow filter.

According to an embodiment of the invention, the method is also suitable to recognize the improper removal or the tampering of the air filter, or, as alternative, a leakage through the engine intake manifold.

Another object of the present invention is a system implementing the abovementioned method.

Another object of the present invention is a combustion engine comprising such system.

A further object of the present invention is a terrestrial vehicle comprising such engine.

These and further objects are achieved by means of the attached claims, which describe preferred embodiment of the invention, forming an integral part of the present description.

BRIEF DESCRIPTION OF THE DRAWINGS

The invention will become fully clear from the following detailed description, given by way of a mere exemplifying and non limiting example, to be read with reference to the attached drawing figures, wherein.

The same reference numerals and letters in the figures designate the same or functionally equivalent parts.

Figure 1:
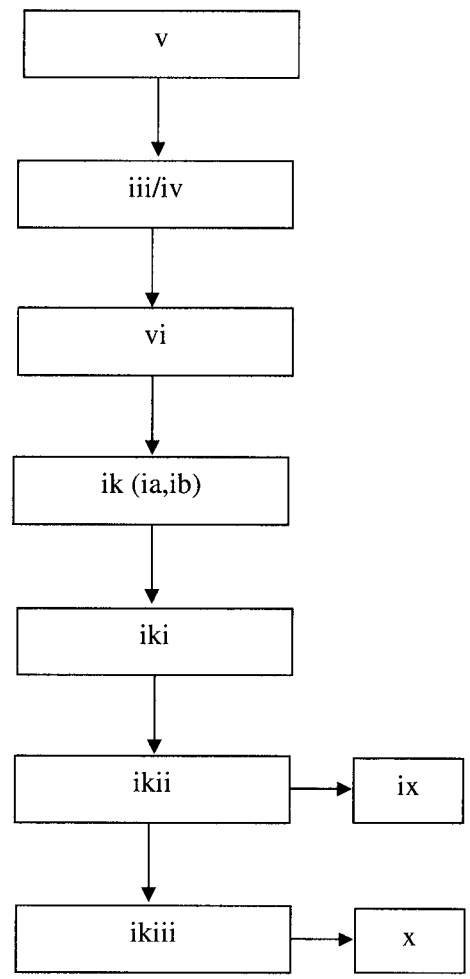
FIG. 1 shows a block diagram describing a preferred embodiment of the method of the present invention.

According to the present invention, the term "second element" does not implies the presence of a "first element", first, second, etc. are used only for improving the clarity of the description and should not be interpreted in a limiting way.

DETAILED DESCRIPTION OF PREFERRED EMBODIMENTS

According to the present invention, the variation of the pressure drop $\Delta p$ over the air filter versus the variation of mean gas velocity through the same filter is considered. For a given filter geometry, the gas velocity can also be expressed through the air volume flow $\dot{V}$. While V indicates the volume, the dot above the same symbol indicates the time derivative of the air volume, or simply air flow $\dot{V}$.

According to the present invention, it has been found that dependency of pressure drop $\Delta p$ over the air filter on the squared volume flow $\dot{V}^2$ is linear, and the two values are interrelated through a factor k:

$$\Delta p = k \cdot \dot{V}^2 \qquad \text{Eq. 1}$$

Factor k corresponds to the angular coefficient of a linear regression calculated on said interrelated values $\Delta p$, $\dot{V}^2$. It includes all information regarding the degree of frictional loss through the flow restriction; here, it either reflects the degree of filter clogging through pollution, or indicates a not properly working filter if less than expected for a clean filter cartridge.

If k or f(k) exceeds a predefined upper threshold ThU, namely when k or f(k)>ThU: YES, then the air filter is acknowledged as clogged, and preferably a DFC (ECU internal diagnostic fault code) is set after some error debouncing.

If, on the contrary, k or f(k) is less than a predefined lower threshold ThL, a DFC for a possibly wrong, or not correctly mounted or removed or tampered filter cartridge is set, or for a leaking air supply system. Also in this case, the DFC is preferably set after some error debouncing.

By setting ThL<Th1< . . . <Thn<ThU, n≥2, an arbitrary number of different interim thresholds can be defined, which allow determination of the state of the air cleaner with higher resolution. As an example, with three different thresholds ThL, Th1 and ThU, thanks to the present method it is possible to distinguish the following conditions:

ThL<k<Th1: filter is acknowledged as new and/or in good conditions;

Th1<k<ThU: filter is acknowledged as dirty, but not yet dangerously clogged: preferably an error is displayed on the vehicle dashboard having the mean "the air filter should be replaced on next occasion";

ThU<k: filter is acknowledged as dangerously clogged and must be replaced immediately (higher pressure threshold): preferably the ECU turns the engine into a recovery mode, with a limited power/torque/speed;

k<ThL: k factor or one function construed on the k factor is too low even for a new filter, namely when k or f(k)<ThL: YES, it means that something is wrong, no cartridge, wrong cartridge, leak, etc. Engine is possibly sucking unfiltered air; preferably the ECU turns the engine into a recovery mode, with a limited power/torque/speed.

In addition, the change of k or f(k) within a small time interval can be exploited to derive additional information. If, referring to above example, the k factor suddenly passes from one of the following conditions Th1<k<ThU or ThU<k to the condition k<ThL, such event is interpreted as a tampering approach: the filter has probably been removed to get rid of the previous errors. Thus, preferably the ECU turns the engine into a recovery mode, with a limited power/torque/speed.

As alternative approach, k can also serve as a direct measure for the state or clogging degree of the filter. The actual k value represents a percentage value between a predefined minimum kMin and a predefined maximum kMax:

$$\text{filter clogging degree } [\%] = \frac{k - k\text{Min}}{k\text{Max} - k\text{Min}} \cdot 100\% \qquad \text{Eq. 2}$$

This approach leads to a comparison of a function of k with the thresholds kMin and Kmax.

The continuously determined filter clogging degree can be used to apply protective countermeasures, like an analogous maximal power reduction, or a threshold logic like the one described above.

Now, we show the application of the present invention to another function of k. As example it can be calculated maximal pressure drop $\Delta p_{max}$ over air cleaner, which would be present at predefined, maximally expected air flow through the filter $\dot{V}_{max}$:

$$\Delta p_{max} = k \cdot \dot{V}_{max}^2 \qquad \text{Eq. 3}$$

Both a threshold approach and a continuous approach like in the abovementioned examples works also for $\Delta p_{max} = f(k)$.

Thus embodiment is the most robust with respect to the other approaches according to the present invention.

According to a preferred embodiment of the present invention, the pressure drop over air cleaner is continuously measured at the sample rate offered by the electronic controller, for example every 10 ms.

The pressure drop over air cleaner is for example measured by a differential pressure sensor over air cleaner, or by an arrangement of absolute pressure sensors up- and downstream air cleaner. In the second case, the pressure difference (drop) is calculated by subtracting the measured absolute pressure after air cleaner (before an optional turbo charger) from an ambient pressure value, acquired by another sensor on-board the vehicle, for example embedded in the ECU.

The air volume flow $\dot{V}$ through the air cleaner is either directly measured by means of an appropriate measuring device in the air flow path, or calculated by the electronic controller, based on other physical measurements like e.g. pressures, temperatures, lambda values, and predefined data, like e.g. engine geometry.

The raw data can be permanently stored within the ECU for later evaluation, for example, if they are in a useful volume flow range. According to a preferred embodiment of the invention the applicable range $[\dot{V}_{min}, \dot{V}_{max}]$ of air flows or alternatively $[\dot{V}_{min}^2, \dot{V}_{max}^2]$ of squared air flows is subdivided into a predefined number of adjacent intervals, for example 8 of the same size, marked through indices 0 to 7. Then, the couples of values are acquired $(\Delta p, \dot{V}^2)$ and grouped on the basis of the respective interval, 0-7, belonging the air flow value and associated to the respective interval. For convenience, such couples are called as "data-couple(s)" in the following.

When an air flow value lies outside such applicable range of air flows, namely when it is lower or higher than the applied min/max values, respectively, it is preferably disregarded or recorded for different uses, namely to recognize abnormal conditions.

In the context of the present invention "applicable range" means a range of air-flow defined by the kind of combustion engine considered within its functioning range in normal conditions.

The aforementioned grouping of the data-couples can be advantageously recorded within two data-matrixes having size (at least) n×8. When an applicable minimum number of data-couples has been updated, a linear regression calculation is performed in order to calculate the k factor:

$$k = \frac{\sum_n (\dot{V}^2 - \overline{\dot{V}^2}) \cdot (\Delta p - \overline{\Delta p})}{\sum_n (\dot{V}^2 - \overline{\dot{V}^2})^2} \qquad \text{Eq. 4}$$

where n is the number of updated data-couples, $\overline{\dot{V}^2}$ and $\overline{\Delta p}$ are respectively average values of the n considered squared air flow and n pressure drop values.

In order to save storage memory, just two 1×8 arrays can be implemented, by storing, step by step, only said $\overline{\dot{V}^2}$ and $\overline{\Delta p}$.

Advantageously, the subdivision of the applicable range of air flows into, preferably 8, "discrete intervals" confers high calculation robustness to the method.

However, a different number of intervals can be accounted for or a different mathematical strategy, per se known, that does not require such range subdivision can be implemented.

The memory arrays can be reset periodically, for example at any engine switching-off, and also after every calculation of k according to Equ. 4, or function of k like in Equ. 3. After that, the data are considered as "used" and reset, i.e. overwritten by the next new set of data.

Especially, in this latter specific case, several tests have been carried out and it has been found that the Equ. 4 could lead to unreliable results with huge errors when the air flow measurements are too close together, this could happens in specific application where the engine is called to run almost stationary.

Thus, the abovementioned range subdivision permits to inhibit the calculation of the Equ. 4, when the acquired values of air-flows are not sufficiently spread. Preferably, the method comprises a step to check that at least 4-5 of the 8 groups associated to the corresponding intervals contain at least one data-couple.

Figure 2:
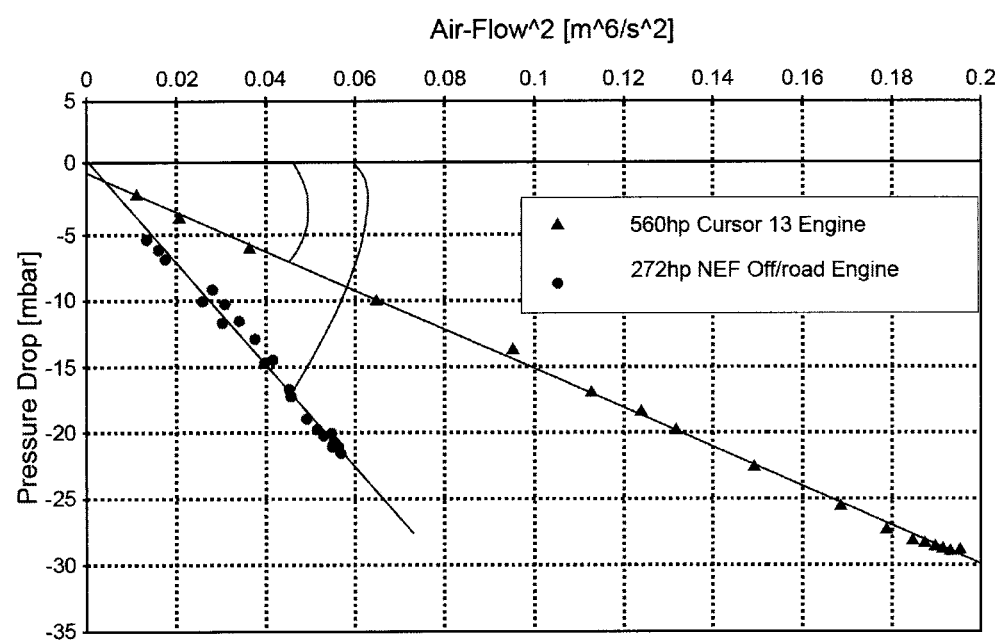
FIG. 2 shows two linear regressions calculated according to the method on FIG. 1, for two different test-bed engines.

FIG. 2 shows graphically examples of calculation of the k factor through the aforementioned linear regression on the data-couples, for two different engines.

FIG. 1 instead shows a preferred embodiment of the method of the present invention, through a block diagram, comprising the following steps in succession:
(v) preliminary acquisition of data-couples values, each comprising pressure drop value (ia) at the air filter and the square of the air flow value (ib) crossing the air filter, corresponding to said pressure drop value,
(iii) subdivision of an applicable range $[\dot{V}_{min}, \dot{V}_{max}]$ of air flows or alternatively $[\dot{V}_{min}^2, \dot{V}_{max}^2]$ of squared air flows into a predefined number of adjacent intervals (0-7), then,
(iv) grouping of said data-couples values $\Delta p$, $\dot{V}^2$ on the basis of the respective interval belonging the air flow value V and associated to the respective interval,
(vi) inhibition of any further calculation, until at least a predefined number of intervals is associated with at least one data-couple,
(ik) Calculation of an angular coefficient k of a linear regression construed on said data-couples,
(iki) comparison of such angular coefficient or one function construed on such angular coefficient with at least one threshold, preferably three thresholds ThL, Th1, ThU, having the follow relationship: ThL<Th1<ThU
and correspondingly
detection (ikii) of one of the following conditions:
First condition: ThL<k<Th1: filter is acknowledged as new and/or in good conditions;
Second condition: Th1<k<ThU: filter is acknowledged as dirty, but not yet dangerously clogged;
Third condition: ThU<k: filter is acknowledged as dangerously clogged;
Fourth condition: k<ThL: the angular coefficient k is acknowledged as too low even for a new filter, thus a severe dangerous condition is acknowledged:
no filter cartridge present,
wrong filter cartridge present,
intake leakage.
(ikiii) detecting of a Fifth condition, when the angular coefficient k suddenly passes from the Second or Third condition to the Fourth condition, indicating a tampering approach
(ix) when said Second condition is acknowledged an error message is displayed (ix) on the vehicle dashboard having the meaning of "the air filter should be replaced on next occasion" and/or
(x) when said Third or Fourth or Fifth condition is acknowledged a severe error message is displayed (x) on the vehicle dashboard and the engine in turned into a recovery mode, with a limited power/torque/speed.

This invention can be implemented advantageously in a computer program comprising program code means for performing one or more steps of such method, when such program is run on a computer. For this reason, the patent shall also cover such computer program and the computer-readable medium that comprises a recorded message, such computer-readable medium comprising the program code means for performing one or more steps of such method, when such program is run on a computer.

Many changes, modifications, variations and other uses and applications of the subject invention will become apparent to those skilled in the art after considering the specification and the accompanying drawings which disclose preferred embodiments thereof. All such changes, modifications, variations and other uses and applications which do not depart from the scope of the invention are deemed to be covered by this invention.

Further implementation details will not be described, as the man skilled in the art is able to carry out the invention starting from the teaching of the above description.

The invention claimed is:

1. Method for controlling a combustion engine on the basis of a detected air filter condition, comprising the following steps:
(ik) calculation of a linear regression over data-couples values, each comprising
pressure drop value (ia) at the air filter
square of air flow value (ib) crossing the air filter, corresponding to said pressure drop value,
in order to obtain an angular coefficient (k) of the linear regression,
(iki) comparison of said angular coefficient or of a function construed on said angular coefficient with at least one threshold ((ThL, Th1, ThU), (kMin, kMax), ($\dot{V}_{min}^2$, $\dot{V}_{max}^2$)) in order to detect (ikii) an operative condition of the air filter, and
limiting speed of the engine when said angular coefficient (k) or said function construed on said angular coefficient exceeds a higher threshold (ThU) (k or f(k)>ThU: YES),
wherein said pressure drop value is acquired (v) by a differential pressure sensor or by subtracting
a first measured absolute pressure, measured by means of a first absolute pressure sensor arranged downstream of the air filter according to air flow direction, from
a second measured absolute pressure, measured by means of a second absolute pressure sensor arranged in the ambient.

2. Method according to claim 1, wherein, when (iki) said angular coefficient (k) or said function construed on said angular coefficient exceeds a higher threshold (ThU) (k or f(k)>ThU: YES), the air filter is acknowledged (ikii) as clogged.

3. Method according to claim 1, wherein, when (iki) said angular coefficient (k) or said function construed on said angular coefficient is lower than a lower threshold (ThL) (k or f(k)<ThL: YES), the air filter is acknowledged (ikii) as tampered or absent or the intake pipe is acknowledged as leaking.

4. Method according to claim 1, wherein (iki) said angular coefficient (k) or said function construed on said angular coefficient is compared with at least three thresholds ThL<Th1<ThU in order to detect one of the following at least four conditions:
   First condition: ThL<k<Th1: filter is acknowledged as new and/or in good conditions;
   Second condition: Th1<k<ThU: filter is acknowledged as dirty, but not yet dangerously clogged;
   Third condition: ThU<k: filter is acknowledged as dangerously clogged;
   Fourth condition: k<ThL: the angular coefficient k is acknowledged as too low even for a new filter, thus a severe dangerous condition is acknowledged:
     no filter cartridge present,
     wrong filter cartridge present,
     intake leakage.

5. Method according to claim 4, comprising a step of detecting (ikiii) of a Fifth condition, when said angular coefficient (k) or a function construed on said angular coefficient suddenly passes from said Second or Third condition to the Fourth condition, indicating a tampering approach.

6. Method according to claim 5, further comprising limiting the speed of the engine when said Fourth or Fifth condition is detected.

7. Method according to claim 1, wherein, said function construed on said angular coefficient (k) is a theoretical maximal pressure drop ($\Delta p_{max}$) corresponding to a predefined theoretical maximal air flow value ($\dot{V}_{max}$).

8. Method according to claim 7, wherein said theoretical maximal pressure drop $\Delta p_{max}$ is given by $$\Delta p_{max} = k \cdot \dot{V}_{max}^2 \quad \text{Eq. 3}$$

where $\dot{V}_{max}$ coincides with said predefined theoretical maximal air flow value.

9. Method according to claim 1, wherein an applicable range [$\dot{V}_{min}$, $\dot{V}_{max}$] of air flows is subdivided (iii) into a predefined number of adjacent intervals (0-7), then, said data-couples values $\Delta p$, $\dot{V}^2$ are grouped (iv) on the basis of the respective interval belonging the air flow value $\dot{V}$ and associated to the respective interval,
and wherein said angular coefficient k is calculated (ik) by means of the following formula $$k = \frac{\sum_n (\dot{V}^2 - \overline{\dot{V}^2}) \cdot (\Delta p - \overline{\Delta p})}{\sum_n (\dot{V}^2 - \overline{\dot{V}^2})^2} \quad \text{Eq. 2}$$

where n is a number of said data-couples, $\overline{\dot{V}}$ and $\overline{\Delta p}$ are average values of the n considered air flows and pressure drops values.

10. Method according to claim 9, further comprising a preliminary step (v) of acquisition of said data-couples $\Delta p$, $\dot{V}^2$ and a subsequent step of inhibition (vi) of said linear regression calculation, until at least a predefined number of intervals is associated with at least one data-couple.

11. Apparatus for controlling a combustion engine on the basis of a detected air filter condition, comprising
   a differential pressure sensor or two or more absolute pressure sensors for acquiring (v) a pressure drop value at the air filter,
   an air flow measuring device or electronic controller for acquiring (v) an air flow value crossing the air filter, corresponding to said pressure drop value
   an ECU adapted to carry out steps including:
   (ik) calculation of a linear regression over data-couples values, each comprising
     pressure drop value (ia) at the air filter
     square of air flow value (ib) crossing the air filter, corresponding to said pressure drop value,
   in order to obtain an angular coefficient (k) of the linear regression,
   (iki) comparison of said angular coefficient or of a function construed on said angular coefficient with at least one threshold ((ThL, Th1, ThU), (kMin, kMax), ($\dot{V}_{min}^2$, $\dot{V}_{max}^2$)) in order to detect (ikii) an operative condition of the air filter, and
   limiting speed of the engine when said angular coefficient (k) or said function construed on said angular coefficient exceeds a higher threshold (ThU) (k or f(k)>ThU: YES).

12. Combustion engine comprising an air filter and an apparatus for detecting its operative conditions according to claim 11.

13. Terrestrial vehicle comprising a combustion engine according to claim 12.

14. A non-transitory computer readable medium on which is recorded a program for controlling a combustion engine on the basis of a detected air filter condition, the program executable by a computer to perform steps comprising:
   (ik) calculation of a linear regression over data-couples values, each comprising
     pressure drop value (ia) at the air filter
     square of air flow value (ib) crossing the air filter, corresponding to said pressure drop value,
   in order to obtain an angular coefficient (k) of the linear regression,
   (iki) comparison of said angular coefficient or of a function construed on said angular coefficient with at least one threshold ((ThL, Th1, ThU), (kMin, kMax), ($\dot{V}_{min}^2$, $\dot{V}_{max}^2$)) in order to detect (ikii) an operative condition of the air filter, and
   limiting speed of the engine when said angular coefficient (k) or said function construed on said angular coefficient exceeds a higher threshold (ThU) (k or f(k)>ThU: YES),
wherein said pressure drop value is acquired (v) by a differential pressure sensor or by subtracting
   a first measured absolute pressure, measured by means of a first absolute pressure sensor arranged downstream of the air filter according to air flow direction, from
   a second measured absolute pressure, measured by means of a second absolute pressure sensor arranged in the ambient.

* * * * *